US008387945B2

(12) United States Patent
Cope

(10) Patent No.: US 8,387,945 B2
(45) Date of Patent: Mar. 5, 2013

(54) METHOD AND SYSTEM FOR A MAGNETIC ACTUATOR

(75) Inventor: David B. Cope, Medfield, MA (US)

(73) Assignee: Engineering Matters, Inc., Medfield, MA (US)

(*) Notice: Subject to any disclaimer, the term of this patent is extended or adjusted under 35 U.S.C. 154(b) by 643 days.

(21) Appl. No.: 12/703,356

(22) Filed: Feb. 10, 2010

(65) Prior Publication Data

US 2010/0200788 A1 Aug. 12, 2010

Related U.S. Application Data

(60) Provisional application No. 61/151,266, filed on Feb. 10, 2009.

(51) Int. Cl.
*F16K 31/08* (2006.01)
*F16K 31/02* (2006.01)
*H01F 7/00* (2006.01)

(52) U.S. Cl. .................. 251/65; 251/129.1; 335/229
(58) Field of Classification Search ............ 74/473.12; 123/90.11; 251/65, 129.09, 129.1
See application file for complete search history.

(56) References Cited

U.S. PATENT DOCUMENTS

| | | | |
|---|---|---|---|
| 3,070,730 A | 12/1962 | Gray et al. | |
| 3,728,654 A | 4/1973 | Tada | |
| 4,439,700 A | 3/1984 | Menzel et al. | |
| 4,512,549 A * | 4/1985 | Gast et al. | 251/129.1 |
| 4,777,915 A | 10/1988 | Bonvallet | |
| 4,794,890 A | 1/1989 | Richeson, Jr. | |
| 5,070,826 A | 12/1991 | Kawamura | |
| 5,097,161 A | 3/1992 | Nashiki et al. | |
| 5,166,652 A * | 11/1992 | Koyama et al. | 335/234 |
| 5,268,662 A | 12/1993 | Uetsuhara et al. | |
| 5,365,210 A | 11/1994 | Hines | |
| 5,434,549 A * | 7/1995 | Hirabayashi et al. | 335/229 |
| 5,437,306 A | 8/1995 | Asou et al. | |
| 5,679,989 A | 10/1997 | Buscher et al. | |
| 5,847,480 A | 12/1998 | Post | |
| 5,887,624 A | 3/1999 | Taniguchi et al. | |
| 5,896,076 A | 4/1999 | van Namen | |
| 5,939,963 A | 8/1999 | Harcombe | |
| 6,057,750 A * | 5/2000 | Sheng | 335/234 |
| 6,259,174 B1 | 7/2001 | Ono | |
| 6,304,320 B1 | 10/2001 | Tanaka et al. | |
| 6,316,849 B1 | 11/2001 | Konkola et al. | |
| 6,355,994 B1 | 3/2002 | Andeen et al. | |
| 6,408,045 B1 | 6/2002 | Matsui et al. | |
| 6,476,702 B1 | 11/2002 | Hartwig et al. | |
| 6,512,571 B2 | 1/2003 | Hara | |

(Continued)

FOREIGN PATENT DOCUMENTS

JP 2003209963 A 7/2003

OTHER PUBLICATIONS

Image from PPT presentation, Corcoran Engineering, Apr. 2001, re: (Linear) Halbach Array Magnet Configuration.

*Primary Examiner* — John K Fristoe, Jr.
*Assistant Examiner* — Frederick D Soski
(74) *Attorney, Agent, or Firm* — Hayes Soloway P.C.

(57) ABSTRACT

The system contains a top permanent magnet and a bottom permanent magnet. The bottom magnet is axially aligned with the top magnet. The top magnet and the bottom magnet have substantially opposing magnetization. A top coil is positioned substantially enclosing the top magnet. A bottom coil is positioned substantially enclosing the bottom magnet. A ferromagnetic spacer is positioned between the top magnet and the bottom magnet. A slug is slidably positioned within the top coil and bottom coil. The slug has an opening formed therein. The slug opening is sized and positioned to slidably receive at least one of the top magnet, the bottom magnet, and the ferromagnetic spacer. An actuating member is integral with the slug.

15 Claims, 6 Drawing Sheets

U.S. PATENT DOCUMENTS

| | | |
|---|---|---|
| 6,590,355 B1 | 7/2003 | Kikuchi et al. |
| 6,633,157 B1 | 10/2003 | Yamaki et al. |
| 6,642,825 B2 | 11/2003 | Ohya |
| 6,991,211 B2 | 1/2006 | Altonji |
| 7,517,721 B2 | 4/2009 | Ito et al. |
| 2001/0017490 A1 | 8/2001 | Suzuki et al. |
| 2002/0190582 A1 | 12/2002 | Denne |
| 2003/0030779 A1 | 2/2003 | Hara |
| 2003/0052548 A1 | 3/2003 | Hol et al. |
| 2004/0025949 A1 | 2/2004 | Wygnaski |
| 2004/0111871 A1 | 6/2004 | Braeuer et al. |
| 2004/0113731 A1 | 6/2004 | Moyer et al. |
| 2005/0139796 A1 | 6/2005 | Altonji |
| 2005/0168311 A1 | 8/2005 | Wright et al. |
| 2005/0211938 A1 | 9/2005 | Ryuen et al. |
| 2006/0012454 A1 | 1/2006 | Sano et al. |
| 2006/0082226 A1 | 4/2006 | Protze |
| 2006/0097830 A1 | 5/2006 | Forstythe et al. |
| 2006/0124880 A1 | 6/2006 | King |
| 2006/0145797 A1 | 7/2006 | Muramatsu et al. |
| 2006/0208842 A1 | 9/2006 | Maerky et al. |
| 2006/0261300 A1 | 11/2006 | Merabet et al. |
| 2006/0278838 A1 | 12/2006 | Chavanne |
| 2007/0018765 A1 * | 1/2007 | Takeuchi ............... 335/229 |
| 2007/0034264 A1 | 2/2007 | Kunz et al. |
| 2009/0121558 A1 * | 5/2009 | Corcoran et al. ............ 310/12 |

* cited by examiner

METHOD AND SYSTEM FOR A MAGNETIC ACTUATOR

CROSS-REFERENCE TO RELATED APPLICATIONS

This application claims priority to copending U.S. provisional application entitled, "Method and System for a Magnetic Actuator," having Ser. No. 61/151,266, filed on Feb. 10, 2009, which is entirely incorporated herein by reference.

FIELD

The present disclosure is related to the field of magnetism, and in particular, is related to direct drive actuators employing a permanent magnet and at least one conducting coil acting on an element of a valve.

BACKGROUND

Actuators are traditionally a mechanical art. Most actuators contain valves, springs, and pivoting elements that move the valves. One of the problems with mechanical actuators is that parts of the mechanical actuators have a tendency to wear down. When the springs become less elastic and the pivoting joints become worn, the valves cease to operate in an efficient manner. An actuator with fewer moving parts would tend to outlast the traditional mechanical actuators.

The inventor of the device disclosed herein has developed a number of magnetic actuators. One possible utility of magnetic actuators is actuating engine valves. High force per unit current, or, more generally, square root input power is an important parameter for automotive exhaust valve actuators and other high force actuators. While other magnetic actuators have produced significant force per square root input power, improved force from the magnetic actuators is desirable.

Thus, a heretofore unaddressed need exists in the industry to provide magnetic actuators that provide high force per square root input power.

SUMMARY

Embodiments of the present disclosure provide a system and method for providing a linear actuator with magnets. Briefly described, in architecture, one embodiment of the system, among others, can be implemented as follows. The system contains a top permanent magnet and a bottom permanent magnet. The bottom magnet is axially aligned with the top magnet. The top magnet and the bottom magnet have substantially opposing magnetization. A top coil is positioned substantially enclosing an extended perimeter of the top magnet. A bottom coil is positioned substantially enclosing an extended perimeter of the bottom magnet. A ferromagnetic spacer is positioned between the top magnet and the bottom magnet. A slug is slidably positioned within the top coil and bottom coil. The slug has an opening formed therein. The slug opening is sized and positioned to slidably receive at least one of the top magnet, the bottom magnet, and the ferromagnetic spacer. An actuating member is integral with the slug.

The present disclosure can also be viewed as providing methods for moving an actuating member. In this regard, one embodiment of such a method, among others, can be broadly summarized by the following steps: providing a top permanent magnet; axially aligning a bottom permanent magnet with the top magnet, wherein the top magnet and the bottom magnet have substantially opposing magnetization; positioning a top coil enclosing an extended perimeter of the top magnet, with a top air gap therebetween; positioning a bottom coil enclosing an extended perimeter of the bottom magnet with a bottom air gap therebetween; positioning a ferromagnetic spacer between the top magnet and the bottom magnet; and driving a current along at least one of the top coil and the bottom coil, sliding a slug, integral with the actuating member, between the top air gap and the bottom air gap, whereby movement of the slug moves the actuating member.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
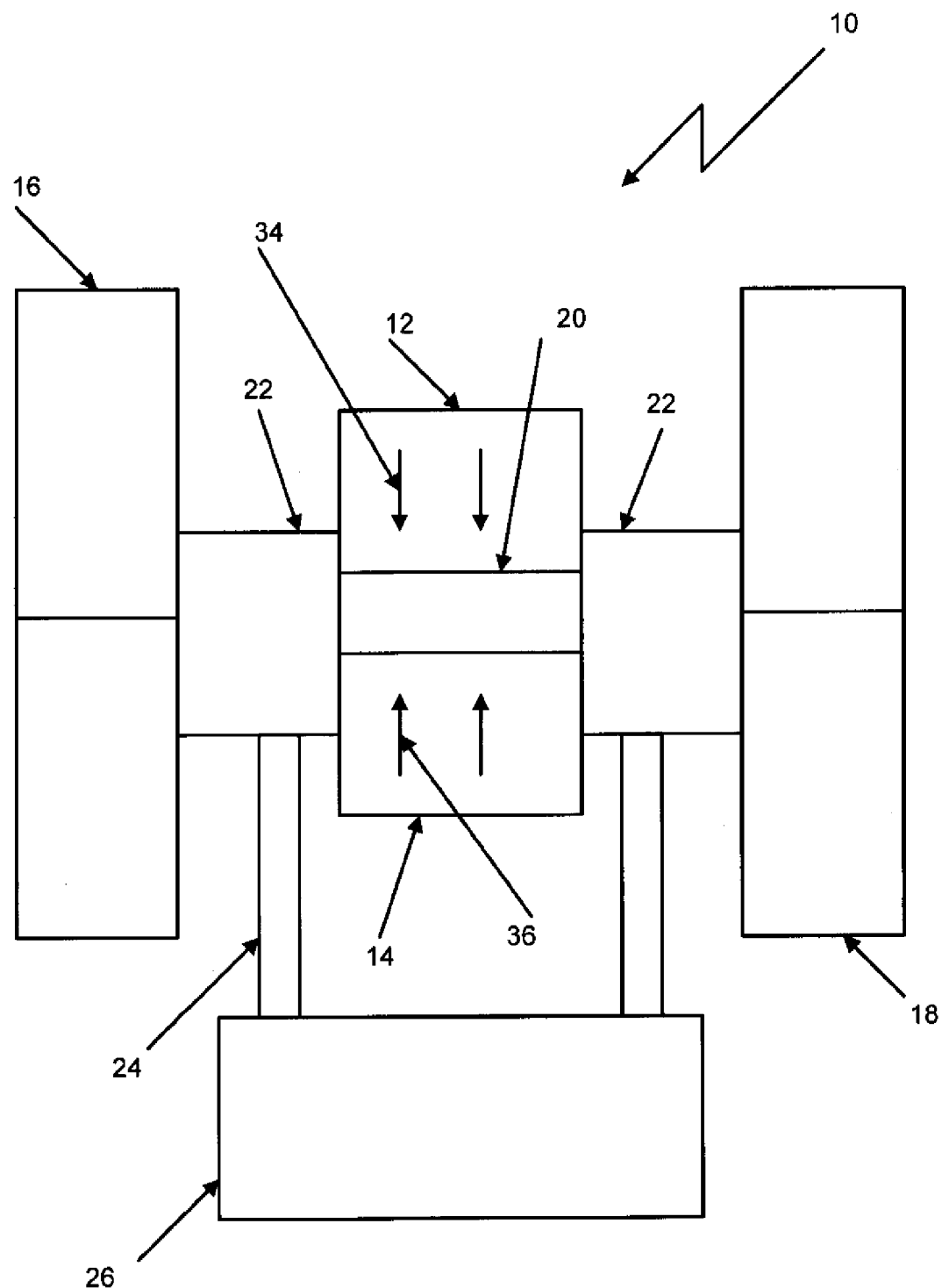
FIG. 1 is an illustration of a cross-sectional side view of a linear actuator, in accordance with a first exemplary embodiment of the present disclosure.

FIG. 1 is an illustration of a cross-sectional side view of a linear actuator 10, in accordance with a first exemplary embodiment of the present disclosure. The linear actuator 10 contains a top permanent magnet 12 and a bottom permanent magnet 14. The bottom magnet 14 is axially aligned with the top magnet 12. The top magnet 12 and the bottom magnet 14 have substantially opposing magnetization. A top coil 16 is positioned substantially enclosing the top magnet 12. A bottom coil 18 is positioned substantially enclosing the bottom magnet 14. A ferromagnetic spacer 20 is positioned between the top magnet 12 and the bottom magnet 14. A slug 22 is slidably positioned within the top coil 16 and bottom coil 18. The slug 22 has an opening formed therein. The slug 22 opening is sized and positioned to slidably receive at least one of the top magnet 12, the bottom magnet 14, and the ferromagnetic spacer 20. An actuating member 26 is integral with the slug 22.

The top and bottom magnets 12, 14 may be stationary magnet arrays. In this exemplary embodiment, only a slug 22 made of a ferromagnetic material moves under the influence of the forces controlled by the excitation of the top and bottom coils 16, 18. The force exerted on the slug 22 is approximately linearly proportional to the applied current and varies roughly linearly over the stroke. A second spacer may be provided axially between the top and bottom coils 16, 18.

The top magnet 12 and the bottom magnet 14 have opposing vertical magnetization, as shown by the top magnetizations 34 and the bottom magnetizations 36. The stroke of the slug 22 may be limited by the top magnet 12, the bottom magnet 14, and mechanical limitations on the movement of the actuating member 26. The magnets 12, 14 and the top and bottom coils 16, 18 provide the magnetomotive force. The actuating member 26 need not and, preferably, does not influence the magnetic circuit. The actuating member 26 may connect to the slug 22 with extension member 24.

Linear actuator 10 performance is measured as force divided by the square root of the input electrical power. The slug 22 may be exclusively ferromagnetic, which may limit possible forces to a reluctance force. The reluctance force is proportional to the square of the magnetic field on one end of the slug 22 subtracted from the square of the magnetic field at the other end of the slug 22. Analyses have shown that a tailored acceleration profile achieves the desired kinematic motion while minimizing power. This power efficiency is a material improvement over alternative actuators.

Figure 2:
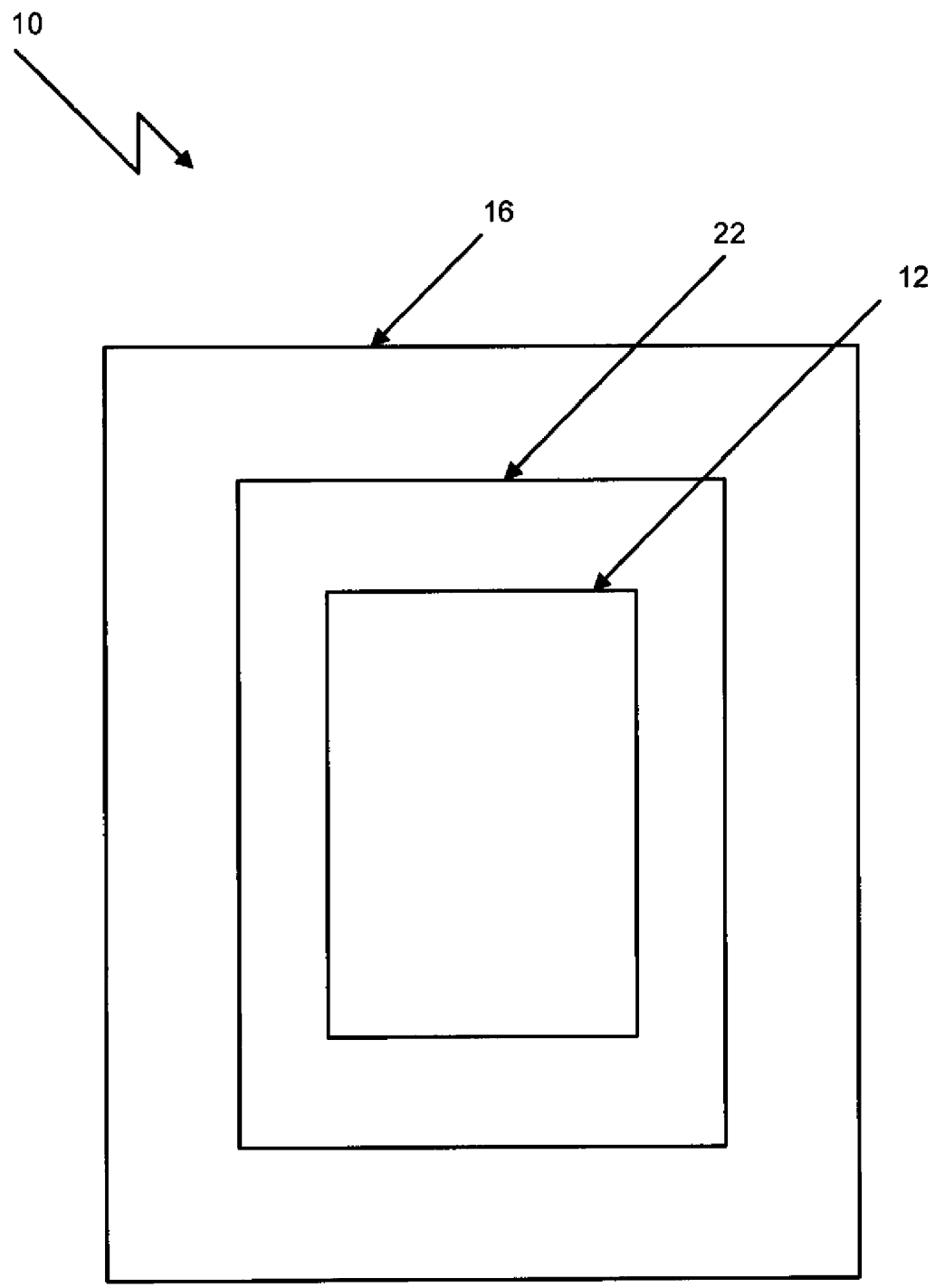
FIG. 2 is an illustration of a cross-sectional top view of the linear actuator of FIG. 1, in accordance with the first exemplary embodiment of the present disclosure.

FIG. 2 is an illustration of a cross-sectional top view of the linear actuator 10 of FIG. 1, in accordance with the first exemplary embodiment of the present disclosure. As seen in FIG. 2, the elements of the first exemplary embodiment may be rectangular prisms. Other shapes of the elements of the linear actuator 10 are possible and within the scope of the present disclosure, although it is likely the shape will be dictated by space available relative to an engine if utilized for actuating an engine valve. The top coil 16 is positioned substantially enclosing the top magnet 12. The slug 22 opening may be sized to receive any of the top magnet 12, bottom magnet 14 (not shown) and spacer 20 (not shown) jointly or individually, dependent on the position of the slug 22 and thickness of each element.

Figure 3:
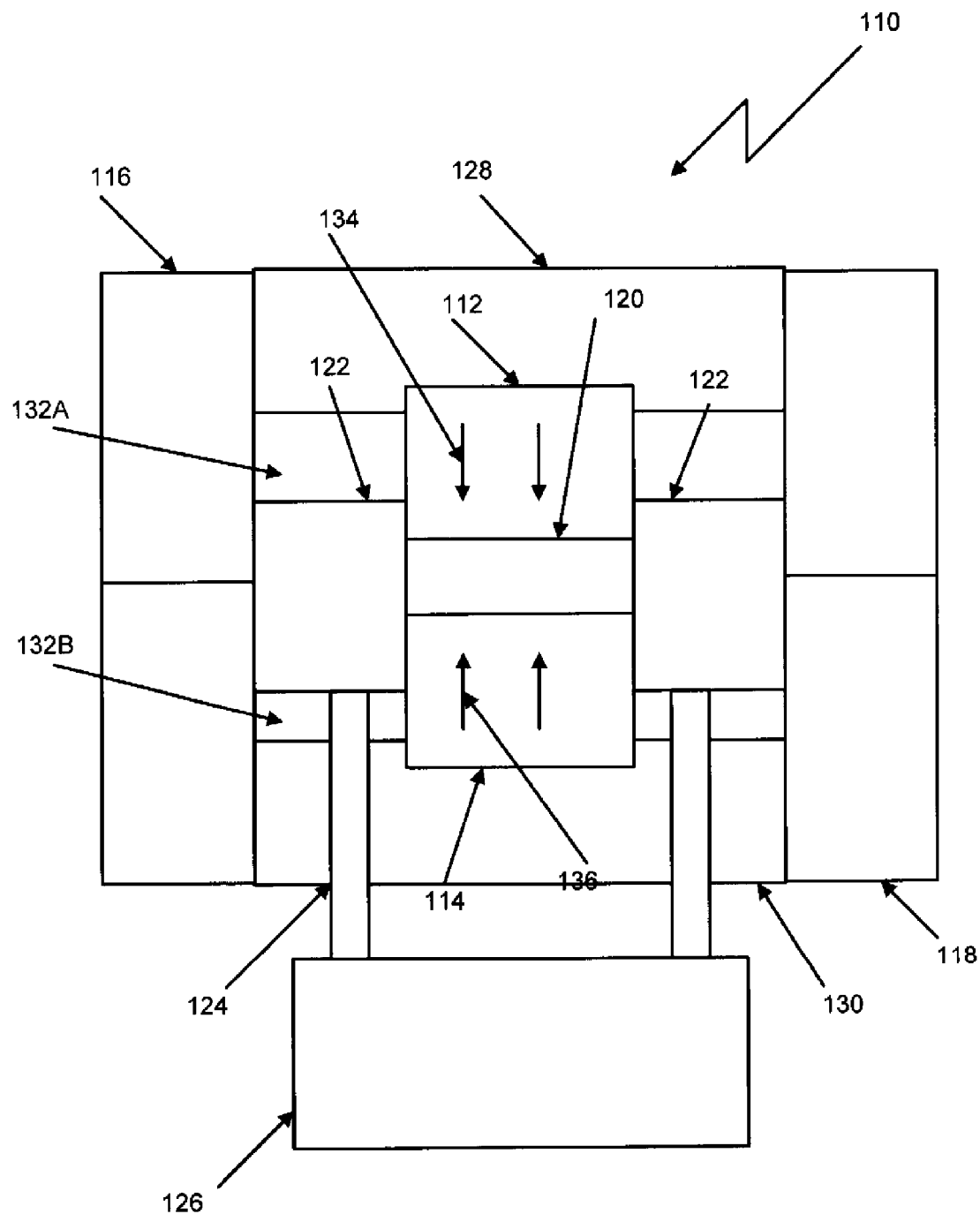
FIG. 3 is an illustration of a cross-sectional side view of a linear actuator, in accordance with a second exemplary embodiment of the present disclosure.

FIG. 3 is an illustration of a cross-sectional side view of a linear actuator 110, in accordance with a second exemplary embodiment of the present disclosure. The linear actuator 110 contains a top permanent magnet 112 and a bottom permanent magnet 114. The bottom magnet 114 is axially aligned with the top magnet 112. The top magnet 112 and the bottom magnet 114 have substantially opposing magnetization. A conductive top coil 116 is positioned substantially enclosing the top magnet 112. A conductive bottom coil 118 is positioned substantially enclosing the bottom magnet 114. A ferromagnetic spacer 120 is positioned between the top magnet 112 and the bottom magnet 114. A slug 122 is slidably positioned within the top coil 116 and bottom coil 118. The slug 122 has an opening formed therein. The slug 122 opening is sized and positioned to slidably receive at least one of the top magnet 112, the bottom magnet 114, and the ferromagnetic spacer 120. An actuating member 126 is integral with the slug 122. The actuating member 126 may be an engine valve.

The second exemplary embodiment further includes a top end cap 128 and a bottom end cap 130. The end caps 128, 130 may be utilized to retain the slug 122 and/or to hold the magnets 112, 114 and spacer 120 in place within the coils 116, 118. The end caps 128, 130 may be magnetically permeable members, used to focus the paths of the magnetic fields on the slug 122. The actuating member 126 may be connected to the slug 122 through the bottom end cap 130. At least one, and preferably a plurality, of rods 124 may connect the slug 122 integrally with the actuating member 126. Opening(s) may be formed in the bottom end cap 130 to allow the rods 124 to pass through the bottom end cap 130 with minimal friction. Rather than forming an opening in the bottom end cap 130, the bottom end cap 130 may be sized to simply avoid the rods 124 by not filling the entire area across the opening in the bottom coil 118, while filling enough space to limit motion of the slug 122 and/or to hold the magnets 112, 114 and spacer 120 in place within the coils 116, 118. While the element integrally connecting the slug 122 and actuating member 126 is identified as one or more rods 124, the element is not limited to any particular cross-sectional shape and the term 'rod' is merely meant to identify some type of extension member.

Air gaps 132A, 132B exists about the top magnet 112 and the bottom magnet 114 and within the top and bottom coils 116, 118. A position of the air gap 132A, 132B varies with the position of the slug 122. The total air gap 132A+132B is constant, but the effective air gap (132A v. 132B) does vary significantly over the stroke. Because of the nature of the reluctance forces, the effective air gap 132A, 132B is measured from the slug 122 to a near surface of the top end cap 128. The magnets 112, 114 and spacer 120 may be integrally joined and held in place mechanically by an element not shown bordering the actuator 110 distal from the actuating member 126. While not as easily illustrated in the first exemplary embodiment, the same principles apply. The top magnet 112 and the bottom magnet 114 have opposing vertical magnetization, as shown by the top magnetizations 134 and the bottom magnetizations 136.

Figure 4:
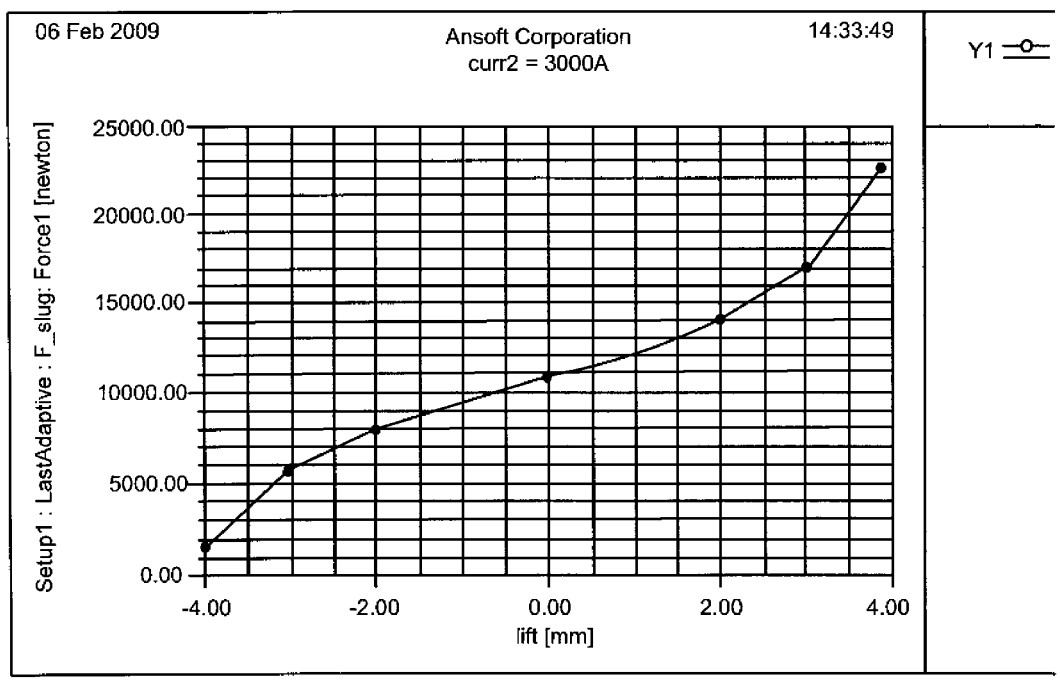
FIG. 4 is an illustration of a graph of typical force vs. lift for a particular set of currents utilizing the linear actuator shown in FIG. 3, in accordance with a second exemplary embodiment of the present disclosure.

FIG. 4 is an illustration of a graph of typical force vs. lift for a particular set of currents utilizing the linear actuator 110 shown in FIG. 3, in accordance with a second exemplary embodiment of the present disclosure. Linear actuator 110 performance is determined by the output force divided by the square root of the input electrical power. The exhaust valve/actuating member 126 required opening force is largely determined by the engine valve diameter and opening pressure. Since the slug 122 may be exclusively ferromagnetic, the only force possible is a reluctance force. The reluctance force may be equal to the slug 122 area times the square of the magnetic field on one surface of the slug 122 subtracted from the slug 122 area time the square of the magnetic field at the other end of the slug 122. The two coils 116, 118 can be driven independently; one adjusted to cancel the attractive magnetic field at one end of the slug 122 (to minimize the magnetic field) while the other coil, of coils 116, 118, is driven with a current intended to develop a magnetic field which attracts the slug 122. This attraction can and should be precisely controlled in order to minimize the dissipated electrical power over the duty cycle.

Figure 5:
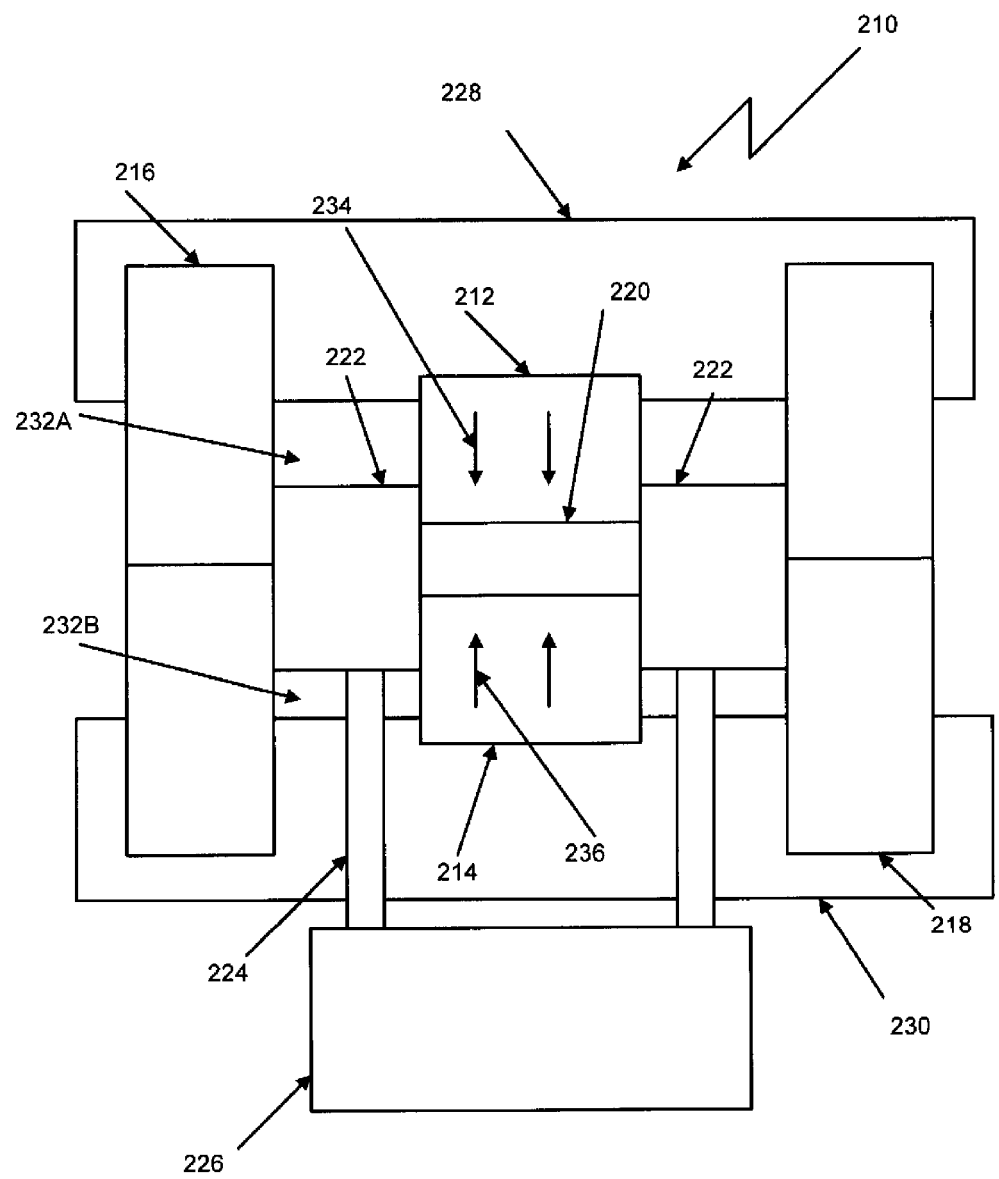
FIG. 5 is an illustration of a cross-sectional side view of a linear actuator, in accordance with a third exemplary embodiment of the present disclosure.

FIG. 5 is an illustration of a cross-sectional side view of a linear actuator 210, in accordance with a third exemplary embodiment of the present disclosure. The linear actuator 210 contains a top permanent magnet 212 and a bottom permanent magnet 214. The bottom magnet 214 is axially aligned with the top magnet 212. The top magnet 212 and the bottom magnet 214 have substantially opposing magnetization. A top coil 216 is positioned substantially enclosing the top magnet 212. A bottom coil 218 is positioned substantially enclosing the bottom magnet 214. A ferromagnetic spacer 220 is positioned between the top magnet 212 and the bottom magnet 214. A slug 222 is slidably positioned within the top coil 216 and bottom coil 218. The slug 222 has an opening formed therein. The slug 222 opening is sized and positioned to slidably receive at least one of the top magnet 212, the bottom magnet 214, and the ferromagnetic spacer 220. An actuating member 226 is integral with the slug 222. The actuating member 226 may be an engine valve.

The third exemplary embodiment further includes a top end cap 228 and a bottom end cap 230. The end caps 228, 230 may be utilized to retain the slug 222 and/or to hold the magnets 212, 214 and spacer 220 in place within the coils 216, 218. The end caps 228, 230 may be magnetically permeable members, used to focus the paths of the magnetic fields on the slug 222. The actuating member 226 may be connected to the slug 222 through the bottom end cap 230. At least one, and preferably a plurality, of extension members 224 may connect the slug 222 integrally with the actuating member 226. Opening(s) may be formed in the bottom end cap 230 to allow the extension members 224 to pass through the bottom end cap 230 with minimal friction. Rather than forming an opening in the bottom end cap 230, the bottom end cap 230 may be sized to simply avoid the extension members 224 by not filling the entire area across the opening in the bottom coil 218, while filling enough space to limit motion of the slug 222 and/or to hold the magnets 212, 214 and spacer 220 in place within the coils 216, 218. As one having ordinary skill in the art may recognize, it is conceivable as well that extension members connecting the actuating member and the slug 222 may extend out of the linear actuating device 210 through openings formed in locations other than those illustrated and all such embodiments are considered to be with scope of the present disclosure.

Air gaps 232A, 232B exists about the top magnet 212 and the bottom magnet 214 and within the top and bottom coils 216, 218. A position of the air gap 232A, 232B varies with the position of the slug 222. The total air gap 232A+232B is constant, but the effective air gap (232A v. 232B) does vary significantly over the stroke. Because of the nature of the reluctance forces, the effective air gap 232A, 232B is measured from the slug 222 to a near surface of the top end cap 228. The magnets 212, 214 and spacer 220 may be integrally joined and held in place mechanically by an element not shown bordering the actuator 210 distal from the actuating member 226. While not as easily illustrated in the first exemplary embodiment, the same principles apply. The top magnet 212 and the bottom magnet 214 have opposing vertical magnetization, as shown by the top magnetizations 234 and the bottom magnetizations 236.

Figure 6:
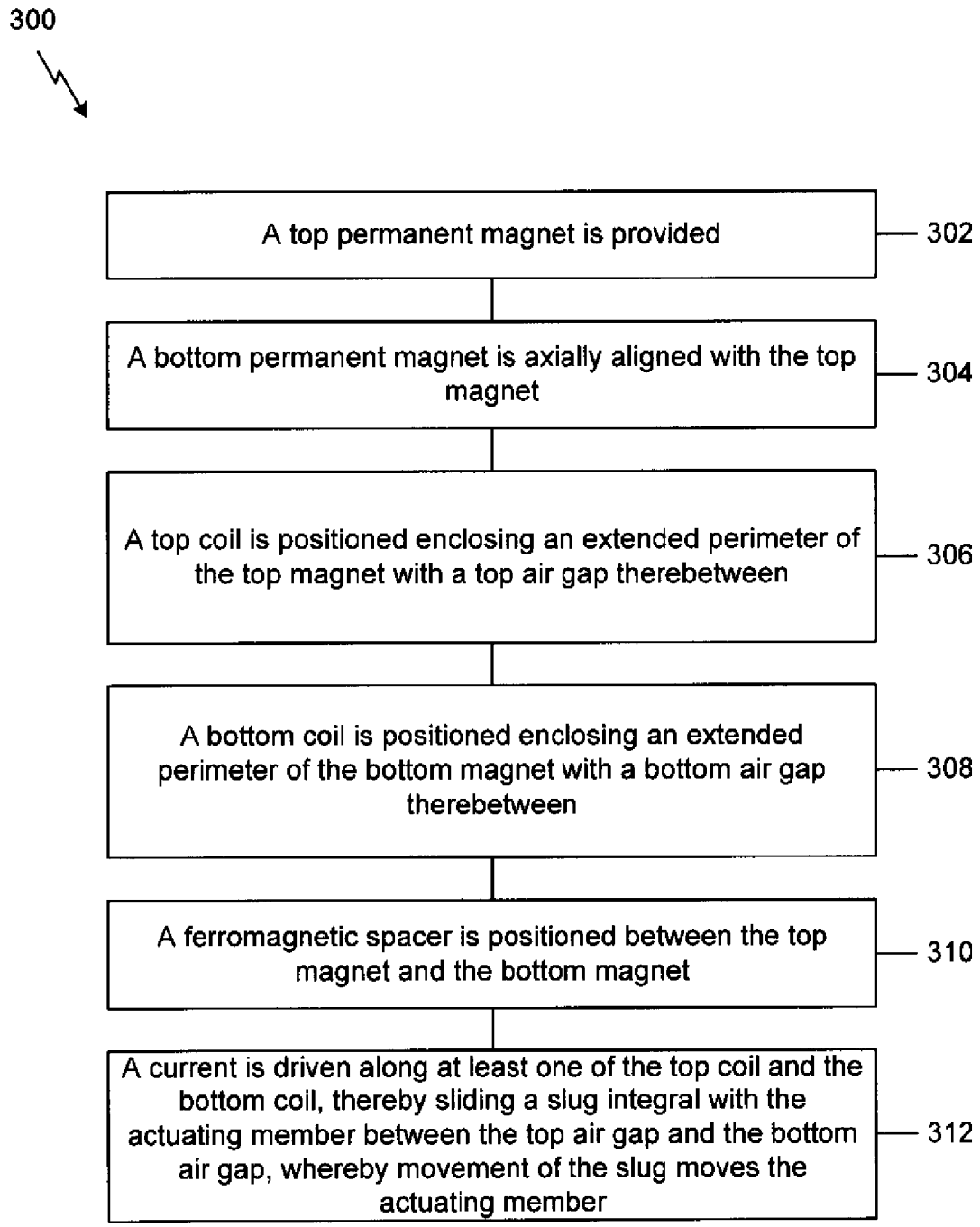
FIG. 6 is an illustration of a flowchart 300 illustrating a method of moving the actuating member of FIG. 1, in accordance with the first exemplary embodiment of the present disclosure.

FIG. 6 is an illustration of a flowchart 300 illustrating a method of moving the actuating member of FIG. 1, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, a top permanent magnet is provided. A bottom permanent magnet is axially aligned with the top magnet (Block 304). The top magnet and the bottom magnet have substantially opposing magnetization. A top coil is positioned enclosing an extended perimeter of the top magnet with a top air gap therebetween (Block 306). A bottom coil is positioned enclosing an extended perimeter of the bottom magnet with a bottom air gap therebetween (Block 308). A ferromagnetic spacer is positioned between the top magnet and the bottom magnet (Block 310). A current is driven along at least one of the top coil and the bottom coil, thereby sliding a slug integral with the actuating member between the top air gap and the bottom air gap, whereby movement of the slug moves the actuating member (Block 312).

The method of moving the actuating member may also include any number of additional steps. The slug may be retained within the coils with a first ferromagnetic member at least partially above the top magnet and a second ferromagnetic member at least partially below the bottom magnet. The current may be driven in a first direction through the top coil and in a substantially similar direction in the bottom coil. The actuating member may be integrally connected to the slug with at least one extension member, which may also be known as a rib. The extension member may be magnetically impermeable. The slug may be retained within the coils with a first ferromagnetic member at least partially above the top magnet and a second ferromagnetic member at least partially below the bottom magnet.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A linear actuating device, comprising:
   a top permanent magnet;
   a bottom permanent magnet, the bottom magnet axially aligned with the top magnet, wherein the top magnet and the bottom magnet have substantially opposing magnetization;
   a top coil positioned enclosing an extended perimeter of the top magnet;
   a bottom coil positioned enclosing an extended perimeter of the bottom magnet;
   a ferromagnetic spacer positioned between the top magnet and the bottom magnet;
   a slug slidably positioned within the top coil and the bottom coil, the slug having an opening formed therein, the opening sized and positioned to slidably receive at least one of the top magnet, the bottom magnet, and the ferromagnetic spacer, wherein the slug comprises at least one ferromagnetic material; and
   an actuating member integral with the slug.

2. The linear actuating device of claim 1, further comprising a first ferromagnetic member above the top magnet and a second ferromagnetic member below the bottom magnet, whereby the slug is retained substantially between the ferromagnetic members.

3. The linear actuating device of claim 1, wherein the actuating member is an engine valve.

4. The linear actuating device of claim 1 further comprising a current distributed over at least one of the top coil and bottom coil, wherein a magnetic field of at least one of the magnets is substantially perpendicular to the current in the at feast one of the top coil and bottom coil respectively.

5. The linear actuating device of claim 1, wherein the top coil, the bottom coil, the top magnet, the bottom magnet, and the slug are substantially rectangular prisms, the top coil, the bottom coil, and the slug having openings therethrough.

6. The linear actuating device of claim 1, further comprising at least one extension member integrally connecting the actuating member and the slug.

7. The linear actuating device of claim 6, further comprising:
   a first ferromagnetic member above the top magnet and a second ferromagnetic member below the bottom magnet, whereby the slug is retained substantially between the ferromagnetic members; and
   at least one extension member opening formed in at least one of the ferromagnetic members, whereby the slug is connected to the actuating member through at least one of the ferromagnetic members.

8. The linear actuating device of claim 7, wherein the actuating member is an engine valve.

9. The linear actuating device of claim 7, wherein the extension member is substantially magnetically impermeable.

10. A method of moving an actuating member, the method comprising the steps of:
    providing a top permanent magnet;
    axially aligning a bottom permanent magnet with the top magnet, wherein the top magnet and the bottom magnet have substantially opposing magnetization;
    positioning a top coil enclosing an extended perimeter of the top magnet, with a top air gap therebetween;
    positioning a bottom coif enclosing an extended perimeter of the bottom magnet with a bottom air gap therebetween;
    positioning a ferromagnetic spacer between the top magnet and the bottom magnet; and
    driving a current along at least one of the top coil and the bottom coil, sliding a slug, integral with the actuating member, between the top air gap and the bottom air gap, whereby movement of the slug moves the actuating member, and wherein the slug has an opening formed therein, the opening sized and positioned to slidably receive at least one of the top magnet, the bottom magnet, and the ferromagnetic spacer.

11. The method of claim 10, further comprising the step of retaining the slug within the coils with a first ferromagnetic member at least partially above the top magnet and a second ferromagnetic member at least partially below the bottom magnet.

12. The method of claim 10, wherein the step of driving the current further comprises driving the current in a first direction through the top coil and driving the current in a substantially similar direction in the bottom coil.

13. The method of claim 10, further comprising integrally connecting the actuating member and the slug with at least one extension member.

14. The method of claim 13, wherein the extension member is magnetically impermeable.

15. The method of claim 13, further comprising the step of retaining the slug within the coils with a first ferromagnetic member at least partially above the top magnet and a second ferromagnetic member at least partially below the bottom magnet.

* * * * *